United States Patent Office 3,428,466
Patented Feb. 18, 1969

3,428,466
CRYSTALLIZABLE ENAMELS FOR
GLASS-CERAMICS
William F. Wolf, Washington, and Raymond Kosiorek, Bridgeville, Pa., assignors, by mesne assignments, to Hercules Incorporated, a corporation of Delaware
No Drawing. Continuation-in-part of application Ser. No. 436,302, Mar. 1, 1965. This application Jan. 25, 1966, Ser. No. 522,819
U.S. Cl. 106—48                                                5 Claims
Int. Cl. C03c 3/08, 7/00

ABSTRACT OF THE DISCLOSURE

Enamels for glass-ceramics having low coefficients of expansion comparable to those of glass ceramics and which after application to glass objects which are to be converted to the glass-ceramic state by controlled nucleation and crystallization are provided by compositions containing by weight on an oxide basis 50–70% $SiO_2$; 10–25% $B_2O_3$; 8–18% $Al_2O_3$; 0.1–10% $Li_2O$; 0.1–6% $TiO_2$ and 0.1–6% $Bi_2O_3$ in proportions adapted to form spodumene after nucleation and crystallization as a major phase.

---

This application is a continuation-in-part of our copending application Ser. No. 436,302, filed Mar. 1, 1965 now abandoned.

The term glass-ceramics is used in the ceramic field to designate products originating as completely vitreous glasses of special compositions made by conventional glass-making procedures but which are thereafter converted by heat treatment to a predominantly crystalline state. Batches for making glass-ceramics contain a nucleating agent together with constituents of inorganic compounds, other than that agent, which usually constitute the major proportion of the glass as made, which can be crystallized from the glass by the nucleating agent. Such a batch is melted to form the glass which is usually transparent and colorless and is referred to in the trade as "green glass." The green glass is converted to a glass-ceramic by a controlled heat treatment at a temperature to nucleate the said agent and at a temperature at which crystallization is initiated by the nucleating agent. The result is a substantially crystalline product made up of very small interlocked crystals about 0.1 to 20 microns in diameter.

One procedure for making glass-ceramics is described in Patent No. 2,920,971 to S. D. Stookey, which describes making glass-ceramics using titanium dioxide as the nucleating agent.

Glass-ceramics possess a unique combination of physical properties which distinguish them from conventional glasses and conventional ceramics. A particularly valuable characteristic is that of especially low coefficients of linear expansion, of the order of minus $7 \times 10^{-7}/°$ C. to plus $120 \times 10^{-7}/°$ C. This property coupled with their non-porous nature, fine grained crystalline structure, glossy surface, opacity and resistance to thermal shock in conjunction with greater hardness, scratch resistance and strength retention to higher temperatures than exhibited by conventional glasses, has resulted during recent years in the use of glass-ceramics on an extensive scale for making dinnerware, cookingware and ovenware, and other articles where ease of maintenance, chemical durability, stability at high temperatures and shock resistance are desirable.

For many years glass articles have been decorated with enamels having coefficients of linear expansion ranging, generally, from about $50 \times 10^{-7}/°$ C. to about $120 \times 10^{-7}/°$ C., depending upon the coefficient of expansion of the glass to which they are applied. For such purposes it is important that the coefficients of expansion of the glass and of the enamel be at least close to one another because if such agreement does not exist the enamel may craze and even weaken the substrate glass. Generally it is best that the coefficient of the enamel be slightly below that of the glass.

The same situation prevails in the case of glass-ceramics, i.e., enamels used with them must have coefficients of expansion matching or close to those of the glass-ceramics, otherwise the spread between them may create seriously objectionable stresses, for instance with impairment of the enamel film. From what has been said it will be understood that enamels satisfactory for conventional glasses do not suffice for the decoration of glass-ceramics.

It is among the objects of this invention to provide enamels for glass-ceramics which have coefficients of expansion comparable to those of the glass-ceramics with which they are to be used, which are prepared as truly vitreous glasses but which can be crystallized by a controlled thermal cycle comparable in function with the time-temperature cycles applied to the crystallized glass substrate of glass-ceramics, which adhere well to the glass-ceramic and possess good film properties, which are produced by the methods commonly used in making ordinary glass enamels, and may be applied to the crystallized glass-ceramic by any of the procedures used in decorating conventional glass.

A particular object is to provide such enamels which after crystallization contain spodumene as at least the major crystalline phase.

A further object is to provide such crystallizable glass enamels the viscosities of which are lower than that of the green glass substrate.

Yet another object is to provide glass-ceramics with a coating of enamel having spodumene as at least its major crystal phase.

Other objects will be recognized from the following specification.

The invention is predicated upon our discovery that crystallizable enamels in conformity with the objects of the invention may be made from compositions which when crystallized contain spodumene ($Li_2O \cdot Al_2O_3 \cdot 4SiO_2$) as the main crystalline phase. These new enamels may be made from compositions of, by weight, on the oxide basis:

|  | Percent |
|---|---|
| $SiO_2$ | 50–70 |
| $B_2O_3$ | 10–25 |
| $Al_2O_3$ | 8–18 |
| $Li_2O$ | 0.1–10 |
| $TiO_2$ | 0.1–6 |
| $Bi_2O_3$ | 0.1–6 |

The enamels are made from the raw materials customarily used in enamel production selected within the foregoing ranges of constituents, to provide the various oxide constituents in amounts such that after melting, nucleation and crystallization the product will have spodumene as at least the major crystalline phase.

The fact that the enamel from any given batch contains spodumene in an amount such that it is at least the major crystalline phase is readily determinable by X-ray methods. In some cases beta-eucryptite may be present as a minor phase.

The enamels may be produced by pot, crucible, or continuous flow melt methods well known in the enamel art, and proper glass formation and viscosity attainment can usually be developed by heating between three and four hours at 1540° C. They are then water cracked and ground to an extremely fine particle size in accordance with usual enamel practices. In this condition the compositions are glass in a state comparable to that of the green glass used in making glass-ceramics.

These enamels exhibit good adherence and film properties when used as enamels for glass-ceramics, they possess the necessary low coefficient of expansion for compatibility with glass-ceramics, and they can be crystallized by application of a proper nucleation and crystallization heat treatment.

A particular feature of the invention resides in our discovery that bismuth oxide is a particularly valuable constituent of our enamels in that it reduces their molten viscosity which in turn improves nucleation and crystallization and aids in the development of the proper coefficient of expansion.

The enamels may be provided in a range of colors by mill additions of coloring compositions standard in the glass enamel trade. Examples of such colors, commonly referred to as oxides or glass colors, are a brown consisting of ferric oxide, chromium oxide, zinc oxide and manganese dioxide; yellow consisting of a praseodymium-zirconium silicate; blue green consisting of alumina, zinc oxide, cobalt oxide, chromium oxide and magnesia; and black oxide consisting of ferric oxide, chromium oxide and cobalt oxide.

These enamels may be applied to a glass-ceramic by any of the methods used in applying enamels to conventional glasses, as by brush, roller, stencil, decalcomania, dusting or spraying. After the enamel has been applied crystallization of the enamel film is accomplished by a controlled heat treatment productive of nucleation and crystallization just as in the case of glass-ceramics. As known in the glass-ceramic art, the exact time and temperature of this cycle may vary somewhat with variations in the composition of the enamel but these are factors that are well understood in the art and are easily determined for any given enamel. For instance, excellent results are to be had with the low expansion spodumene compositions by giving a glossing treatment, for example 20 minutes at 1700° to 1800° F., depending on the glass-ceramic, and then following this cycle:

Cool to 900° F. _____minutes__ 15 to 30
Hold at 900° F. _____hours__ 1
Heat 900 to 1600° F. _____do____ 1
Hold at 1600° F. _____do____ 3
To room temperature _____do____ 3

A considerable improvement can be obtained by using the following crystallization cycle in place of the above cycle:

Heat 1700° F. or 1800° F. (glossing) __min__ 20
Cool to 900° F. _____hours__ ¼ to ½
Hold at 900° F. _____do____ 1
Heat 900° F. to 975° F. _____do____ ½
Heat 975° F. to 1050° F. _____do____ ½
Heat 1050° F. to 1125° F. _____do____ ½
Heat 1125° F. to 1200° F. _____do____ ½
Heat 1200° F. to 1275° F. _____do____ ½
Heat 1275° F. to 1350° F. _____do____ ½
Heat 1350° F. to 1425° F. _____do____ ½
Heat 1425° F. to 1500° F. _____do____ ½
Heat 1500° F. to 1600° F. _____do____ ½
Hold at 1600° F. _____do____ 2
Cool to room temperature.

As illustrative of the invention reference may be made to the following stable spodumene compositions:

| Compound | A | | B | | C | |
|---|---|---|---|---|---|---|
| | Wt. as oxide | Percent oxide | Wt. as oxide | Percent oxide | Wt. as oxide | Percent oxide |
| $SiO_2$ | 425 | 59.19 | 375 | 58.69 | 375 | 56.05 |
| $B_2O_3$ | 96 | 13.37 | 84 | 13.15 | 84 | 12.56 |
| $Al_2O_3$ | 80 | 11.14 | 80 | 12.52 | 110 | 16.44 |
| $Li_2O$ | 57 | 7.94 | 45 | 7.04 | 45 | 6.73 |
| $TiO_2$ | 30 | 4.18 | 30 | 4.69 | 30 | 4.48 |
| $Bi_2O_3$ | 30 | 4.18 | 25 | 3.91 | 25 | 3.74 |
| Expansion | $13.4 \times 10^{-7}/°C$ | | $19.7 \times 10^{-7}/°C$ | | $14.4 \times 10^{-7}/°C$ | |

| Compound | D | | E | | F | |
|---|---|---|---|---|---|---|
| | Wt. as oxide | Percent oxide | Wt. as oxide | Percent oxide | Wt. as oxide | Percent oxide |
| $SiO_2$ | 400 | 59.35 | 375 | 59.52 | 375 | 60.49 |
| $B_2O_3$ | 84 | 12.46 | 84 | 13.33 | 70 | 11.29 |
| $Al_2O_3$ | 90 | 13.35 | 80 | 12.70 | 80 | 12.90 |
| $Li_2O$ | 45 | 6.68 | 36 | 5.72 | 40 | 6.45 |
| $TiO_2$ | 30 | 4.45 | 30 | 4.76 | 30 | 4.84 |
| $Bi_2O_3$ | 25 | 3.71 | 25 | 3.97 | 25 | 4.03 |
| Expansion | $16.2 \times 10^{-7}/°C$ | | $13.9 \times 10^{-7}/°C$ | | $15.1 \times 10^{-7}/°C$ | |

After proper nucleation and crystallization of glasses made from these compositions, as by the foregoing cycles, the crystallized products will have the coefficients of thermal expansion stated for each composition.

Other coefficients of expansion may be developed by variations of the batch while assuring that the resultant glass will when crystallized have spodumene as at least its main phase.

We claim:

1. A crystallizable glass consisting essentially of, by weight, on the oxide basis 50 to 70 percent of $SiO_2$, 10 to 25 percent of $B_2O_3$, 8 to 18 percent of $Al_2O_3$, 0.1 to 10 percent of $Li_2O$, 0.1 to 6 percent of $TiO_2$, and 0.1 to 6 percent of $Bi_2O_3$ in proportions adapted to be converted to spodumene as at least a major phase by a thermally induced nucleation and crystallization.

2. A composition for making crystallizable enamels consisting essentially of, by weight, 50 to 70 percent of $SiO_2$, 10 to 25 percent of $B_2O_3$, 8 to 18 percent of $Al_2O_3$, 0.1 to 10 percent of $Li_2O$, 0.1 to 6 percent of $TiO_2$, and 0.1 to 6 percent of $Bi_2O_3$.

3. A composition for making crystallizable enamels consisting essentially of, by weight, 59.19 percent of $SiO_2$, 13.37 percent of $B_2O_3$, 11.14 percent of $Al_2O_3$, 7.94 percent of $Li_2O$, 4.18 percent of $TiO_2$, and 4.18 percent of $Bi_2O_3$.

4. A composition for making crystallizable enamels consisting essentially of, by weight, 58.69 percent of $SiO_2$, 13.15 percent of $B_2O_3$, 12.52 percent of $Al_2O_3$, 7.04 percent of $Li_2O$, 4.69 percent of $TiO_2$, and 3.91 percent of $Bi_2O_3$.

5. That method of decorating a glass-ceramic article comprising applying to a surface of said article a coating of glass consisting essentially of, by weight, on the oxide basis 50 to 70 percent of $SiO_2$, 10 to 25 percent of $B_2O_3$, 8 to 18 percent of $Al_2O_3$, 0.1 to 10 percent of $Li_2O$, 0.1 to 6 percent of $TiO_2$, and 0.1 to 6 percent of $Bi_2O_3$ in proportions adapted to be converted to spodumene as at least a major phase by a thermally induced nucleation and crystallization, subjecting said coated article to a nucleating heat treatment and then to a crystallization heat treatment and thereby converting said coating to spodumene as at least its major crystalline phase.

References Cited

UNITED STATES PATENTS

| | | | |
|---|---|---|---|
| 2,225,162 | 12/1940 | Deyrup | 106—49 |
| 2,385,580 | 9/1945 | Knox | 106—49 |
| 2,492,523 | 12/1949 | Coffeen et al. | 106—49 |
| 2,556,896 | 6/1951 | Beatty et al. | 106—49 |
| 3,006,775 | 10/1961 | Chen | 106—49 |

TOBIAS E. LEVOW, *Primary Examiner.*

ROBERT D. EDMONDS, *Assistant Examiner.*

U.S. Cl. X.R.

106—39, 54